(12) United States Patent
Leppiaho

(10) Patent No.: US 11,312,286 B2
(45) Date of Patent: Apr. 26, 2022

(54) INTERCHANGING METHOD AND ARRANGEMENT FOR INTERCHANGING LOAD UNITS

(71) Applicant: DELETE FINLAND OY, Helsinki (FI)

(72) Inventor: Tommi Leppiaho, Turku (FI)

(73) Assignee: LOTUS DEMOLITION OY, Vantaa (FI)

( * ) Notice: Subject to any disclaimer, the term of this patent is extended or adjusted under 35 U.S.C. 154(b) by 0 days.

(21) Appl. No.: 16/604,556

(22) PCT Filed: Aug. 16, 2017

(86) PCT No.: PCT/FI2017/050577
§ 371 (c)(1),
(2) Date: Oct. 10, 2019

(87) PCT Pub. No.: WO2017/182719
PCT Pub. Date: Oct. 26, 2017

(65) Prior Publication Data
US 2021/0114829 A1   Apr. 22, 2021

(30) Foreign Application Priority Data

Apr. 11, 2017   (FI) .................................... 20175337

(51) Int. Cl.
*B60P 1/64*     (2006.01)
*B60P 1/48*     (2006.01)
(Continued)

(52) U.S. Cl.
CPC ............. *B60P 1/6427* (2013.01); *B60P 1/483* (2013.01); *B60P 1/6409* (2013.01);
(Continued)

(58) Field of Classification Search
CPC ....... B60P 1/483; B60P 1/6409; B60P 1/6427; B60P 1/6463; B60P 1/6481; B60P 1/649; B65F 2003/008
(Continued)

(56) References Cited

U.S. PATENT DOCUMENTS 2,305,148 A * 12/1942 Dempster ............. B60P 1/5428
                                                       414/424
3,404,793 A * 10/1968 Pinkert ................... B60P 1/483
                                                       414/812
(Continued)

FOREIGN PATENT DOCUMENTS

CA   2590853 A1   12/2008
CN   1220635 A    6/1999
(Continued)

OTHER PUBLICATIONS

European Search Report dated Nov. 25, 2020 for EP Application No. 17785516.
(Continued)

*Primary Examiner* — James Keenan
(74) *Attorney, Agent, or Firm* — Thomas | Horstemeyer, LLP

(57) ABSTRACT

Various examples of arrangements and methods are provided for loading and unloading first and second load units carried by a vehicle. A landing device is arranged between a first end of the first load unit and a second end of the second load unit so that a first portion of the landing device is supported to the first end of the first load unit and a second portion of the landing device is supported to the second end of the second load unit. The landing device can move the first end of the first load unit into a lower level than the
(Continued)

second end of the second load unit after the first end of the first load unit is moved so that it passes the second end of the second load unit.

21 Claims, 9 Drawing Sheets

(51) Int. Cl.
  *B65F 3/00* (2006.01)
  *B65G 57/03* (2006.01)
  *B65G 67/02* (2006.01)
(52) U.S. Cl.
  CPC .......... *B60P 1/6463* (2013.01); *B60P 1/6481* (2013.01); *B65F 2003/008* (2013.01); *B65G 57/03* (2013.01); *B65G 67/02* (2013.01)
(58) Field of Classification Search
  USPC ..................................................... 414/491
  See application file for complete search history.

(56) References Cited

U.S. PATENT DOCUMENTS

| | | | |
|---|---|---|---|
| 5,085,448 A | 2/1992 | Shubin | |
| 10,322,874 B1 * | 6/2019 | Curley | B60P 1/6427 |

FOREIGN PATENT DOCUMENTS

| | | |
|---|---|---|
| CN | 101855127 A | 10/2010 |
| CN | 204675178 U | 9/2015 |
| DE | 1814242 A1 | 10/1970 |
| DE | 19526605 A1 | 1/1997 |
| DE | 10311359 A1 | 10/2004 |
| DE | 10325373 A1 | 1/2005 |
| DE | 102014107144 B3 | 6/2015 |
| EP | 0308615 A1 | 3/1989 |
| EP | 1413477 A1 | 4/2004 |
| FI | 61151 B | 2/1982 |
| JP | 2010274757 A | 12/2010 |

OTHER PUBLICATIONS

Search Report for PCT/FI2017/050577 dated Oct. 31, 2017.
Written Opinion for PCT/FI2017/050577 dated Nov. 20, 2017.
International search report for Chinese application No. 2017800914832 dated Aug. 23, 2021.
Office Action received for 2017800914832 dated Aug. 23, 2021.

* cited by examiner

INTERCHANGING METHOD AND ARRANGEMENT FOR INTERCHANGING LOAD UNITS

CROSS-REFERENCE TO RELATED APPLICATIONS

This application is the 35 U.S.C. §371 national stage application of PCT Application No. PCT/FI2017/050577, filed Aug. 16, 2017, where the PCT claims priority to, and the benefit of, Finnish application no. 20175337, filed Apr. 11, 2017, both of which are herein incorporated by reference in their entireties.

TECHNICAL FIELD OF THE INVENTION

The invention relates to a method and arrangement for interchanging load units carried by a vehicle. Especially the invention relates to interchange a first load unit carried at first by the vehicle to a second load unit locating originally on the ground next to the vehicle or the like so that the first load unit is at first unloaded from the vehicle and the second load unit is then loaded to the vehicle.

BACKGROUND OF THE INVENTION

It is known to transport a skip or interchangeable load unit by a vehicle, such as a truck, unload or remove the load unit off the vehicle and then load another load unit to the vehicle. Very often the purpose for interchanging the load units, such as containers, is to bring a new empty container e.g. into a construction site or other site and take a full container away. Typically the space is very limited on the site or otherwise the new empty container must be left exactly to the same place as the full container located, which causes problems. For example when the empty container is brought to the site, there might be no free space to unload the container on the site even temporary, whereupon the empty container must be left somewhere else, take the full container and transport it some other place out the site, and after this pick the empty container back and provide it to the site and only after this to load the full container already transferred out from the site again on the vehicle for off transport. This is the case especially in a city area or other densely populated area or a construction site, where there is no free space to the interchanging process of the containers. Sometimes it might be that a first truck is bringing the empty container with another empty truck, where the empty truck takes at first the full container to be taken away, and after which the first truck can leave the empty container and returning back empty.

It is clear that this causes many unnecessary steps and unnecessary driving, which takes lot of time or takes number of trucks where the one is driving empty to the site and another is driving back empty, making the whole interchanging process remarkably ineffective. Therefore there is a clear need for a system to enable an effective way to interchange the containers or the load units also in the site with limited space so that the unnecessary steps and driving can be avoided.

SUMMARY OF THE INVENTION

An object of the invention is to alleviate and eliminate the problems relating to the known prior art. Especially the object of the invention is to provide an arrangement and method for interchanging containers or other load units so that the interchanging process of the containers can be done on the site without a need for leaving the empty container somewhere other place at first, take the full container and transfer it somewhere else, take the empty container again and transfer it to the destination site and after this to take the original full container again on the vehicle. Especially the object of the invention is to provide an arrangement and method so that the containers can be replaced or interchanged without any need for moving the vehicle and so that the new container brought to the site is placed essentially on the same location than the container to be taken away.

The object of the invention can be achieved by the features of independent claims.

The invention relates to an arrangement for interchanging at least two load units. In addition the invention relates to a method for interchanging at least two load units, as well as also to a load unit and a vehicle comprising the interchanging arrangement.

According to an embodiment of the invention an interchanging arrangement is provided for interchanging at least first and second load units carried by a vehicle. The interchanging the load unit means e.g. unloading a first load unit from the vehicle on the ground and loading a second load unit to the same vehicle. The load unit is e.g. an interchangeable platform or container or the like having first and second ends. The arrangement is advantageously mountable on the vehicle or to the load unit, in particular to the end portion of the load unit.

The interchanging arrangement or the vehicle comprises advantageously a moving device, such as e.g. a traditional hook system or any other possible implementation, such as a chain, strap, belt or cable arranged for moving and unloading the first load unit from the vehicle in a first direction, typically backwards. In addition the first load unit is moved onto the top of the second load unit locating next to the vehicle, such as on the ground and on the backside or rear extension of the vehicle, for example. After moving the first load unit on the top of the second load unit, the moving device releases the first load unit and grips the second load unit below the first load unit. When gripped it moves and loads the second load unit onto the vehicle so that the first load unit is still (at least partially) on the top of the second load unit at least at the beginning of the moving of the second load unit and so that the first load unit slides on the top and along the second load unit essentially in said first direction in relation to the second load unit during loading the second load unit onto the vehicle. The first load unit slides on the top and along the second load unit advantageously until the first end of the first load unit meets and/or passes the second end of the second load unit. Also the second end of the first load unit typically meets the ground when the first load unit slides along the second load unit.

According to an advantageous embodiment the interchanging arrangement comprises also a landing device arranged between the first end of the first load unit and the second end of the second load unit moving or lowering the first end of the first load unit to the ground in a secured and advantageously also in a controllable manner. Advantageously a first portion of the landing device is supported to the first end of the first load unit and a second portion of the landing device is supported to the second end of the second load unit. The landing device can be implemented e.g. by a cable or hook with a braking cylinder, for example.

The landing device is advantageously configured to move the first end of said first load unit into a lower level than the second end of the second load unit, advantageously to the ground. Lowering the first end of the first load unit is configured to happen advantageously when the moving device moves and loads the second load unit onto the vehicle, and after the first end of the first load unit has met and advantageously also passed or is passing the second end of the second load unit.

According to an advantageous embodiment the arrangement or the landing device comprises also a braking member to slow down the landing of the first end of the first load unit so that the first end of the first load unit does not hit the ground due to the gravity and cause any damage or dangerous situation. The braking member can be implemented e.g. by a brake cylinder, such as a pneumatic or hydraulic cylinder or a spring or a mechanical construction, such as a friction brake. In addition also an electric or hydraulic motor can be used for braking or resisting the movement of the first end of the first load unit towards the ground. As an example a cable, belt or chain or the like can also be attached to the first load unit and in particularly to the first end of the first load unit so that it can be moved downwards in a controllable manner, such as unwinding the cable by the motor or the like. According to an embodiment the braking device is configured to be operated in a controllable manner and in that way to control also the movement or lowering of the first end of the first load unit.

According to an embodiment the interchanging arrangement may also comprise a braking system for controlling the sliding speed of the first load unit when it slides on the top and along the second load unit in said first direction or in relation to the second load unit during the loading said second load unit onto the vehicle so that the first load unit does not hit the ground in an uncontrolled manner. When the first load unit slides along the second load unit, the arrangement is advantageously configured to release the braking system from the first unit at the latest after the first end of the first load unit has met and passed the second end of the second load unit.

According to an embodiment the load unit used in the interchanging arrangement advantageously comprises a sliding path, such as e.g. a rail or groove or the like arranged advantageously into the top portion of the load unit to receive and allow another load unit to slide along the sliding path in the first direction or in relation to the lower load unit during loading or unloading the load units onto or from the vehicle.

According to an embodiment the second load unit may comprise the sliding path and additionally a locking member. The locking member may be arranged in the connection with the sliding path so that is stops the sliding of the first load unit when it slides on the sliding path e.g. during the unloading said first load unit off the vehicle and/or loading said second load unit onto the vehicle. According to an example the first load unit may comprise a sliding member, which is configured to slide along said sliding path, whereupon the sliding member is configured to hit or touch the locking member and thereby stops the sliding. The sliding path with the sliding member also guides and keeps the first load unit sliding in a controllable manner along the second load unit so that the first load unit cannot e.g. drop off the second load unit.

The locking member may comprises a deflecting member, advantageously a ramp, such as a wedge ramp for deflecting the sliding member of the first load unit against a stopping member via an interaction with said sliding member of the first load unit, when the first load unit slides on the sliding path. The locking member is advantageously arranged in a position so that when the sliding member meets the locking member, the major portion (or a center of gravity, typically geometrical center portion) of the first load unit sliding is slid and just passed or at least is passing the second end of the second load unit. At or just after this point the second end portion of the first load unit will be tilted downwards due to gravity so when the second end portion of the first load unit is not supported by the second load unit anymore. When the deflecting member deflects the sliding member of the first load unit against the stopping member in this position, the sliding member of the first load unit is then kept against the stopping member due to gravity thereby preventing any further sliding of the first load unit. It is to be noted that the first load unit can be slid again to the end when the second end of the first load unit is supported to the ground, for example.

Advantageously the locking member is an adjustable locking member where the position of the locking member can be adjusted in relation to the second load unit. The position of the locking member should be selected based on the dimensions, especially the length, and the center of gravity (so typically geometrical center portion) of said first load unit sliding along said sliding path so that the deflecting member will deflect and especially the stopping member will stop the sliding member when the center of gravity of the first load unit is passed the second end portion of the second load unit. In this way it can be ensured that the second end portion of the first load unit is tilted downwards and again the first end portion and thus also the sliding member is tilted upwards and against the stopping member due to gravity. Therefore the stopping member is able to stop and keep the first load unit stationary in relation to the second load unit. According to an example the locking member comprises number of stopping members, both in the upper and lower portions of the sliding path in order to further ensure the stopping the sliding of the first load unit in relation to the second load unit.

The first load unit can slide further in relation to the second load unit and even off the second load unit when the first end of the first load unit is passed the stopping members. This can be achieved e.g. by moving the first end or the sliding member downwards slightly, which again can be achieved e.g. by lifting the second end of the first load unit little bit. Lifting of the second end of the first load unit can be done by pressing it against the ground, like raising the second load unit upright position and thereby releasing the locking of the first load unit.

It is to be noted that the locking member may have different positions but also lengths, whereupon the stopping of the sliding of the second load unit can be guaranteed more confident. In addition it is to be noted the stopping member may comprise a shock absorption mechanism for absorbing kinetic energy of the first load unit when stopping the movement of said first load unit. The shock absorption mechanism can be implemented e.g. by a rubber member, spring or the like known by the skilled person. In addition the shock absorption mechanism is advantageously fixedly arranged into the second load unit, whereupon when the first unit slides and collides with the stopping member, the whole locking member will move in relation to the second load unit due to and controlled by the shock absorption mechanism.

Due to the locking member the interchanging arrangement can be implemented even without the braking system, which is otherwise used to control the sliding speed of the first load unit. The locking member can also be used for increasing safety, namely it will stops the sliding first unit always due to the deflecting member and the stopping member, which are advantageously implemented mechanically.

In addition the second load unit may comprise an introduction member at an end portion of the second end of the second load unit, where said introduction member is configured to introduce the first end of the first load unit to the landing device.

The introduction member may comprise e.g. a deflection member, advantageously a ramp, such as a wedge ramp, which will deflect the first end of the first load unit or the sliding member of the first load unit so that it meets the landing device, and according to an exemplary embodiment advantageously meets the second end (a free end portion) of the of the landing device. When the first end of the first load unit has met the second end of the second load unit and the second end of the of the landing device, the landing device moves the first end of the first load unit into the lower level than the second end of the second load unit, as is described elsewhere in this document. The introduction member additionally ensures that the second end portion of the first load unit is caught by the landing device and advantageously by the free end of the landing device.

The present invention offers advantages over the known prior art, such as enables very easy and time consuming interchanging process of the containers also in a very limited space and so that the vehicle used for the transportation of the containers can stay still for the whole interchanging process. In particularly the invention enables to unload the first load unit from the vehicle to the ground and load the second load unit from the ground into the vehicle without any need for moving the vehicle and so that the first load unit is left after the interchanging process essentially to the same place as the second unit originally located.

The exemplary embodiments presented in this text are not to be interpreted to pose limitations to the applicability of the appended claims. The verb "to comprise" is used in this text as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

BRIEF DESCRIPTION OF THE DRAWINGS

Next the invention will be described in greater detail with reference to exemplary embodiments in accordance with the accompanying drawings, in which.

DETAILED DESCRIPTION

Figure 1A:
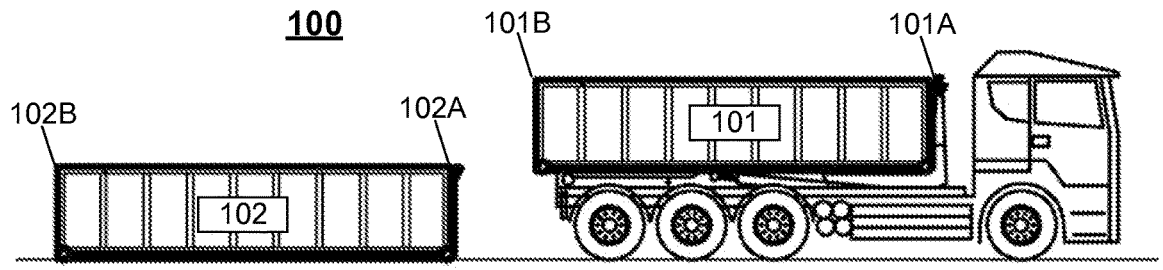
FIGS. 1A-1J illustrate a principle of an exemplary interchanging arrangement and method for interchanging first and second load units carried by a vehicle according to an advantageous embodiment of the invention.
Figure 1B:
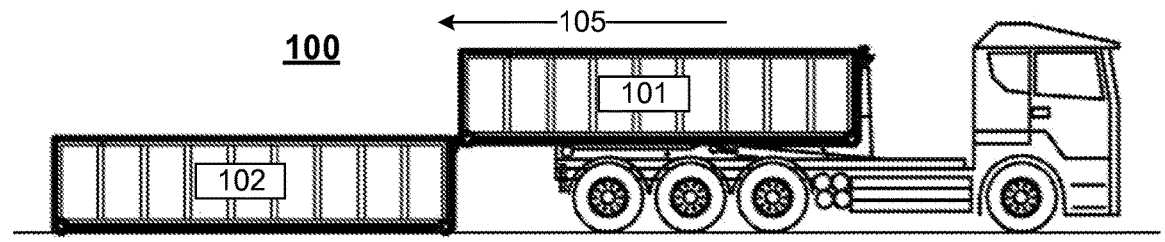
Figure 1C:
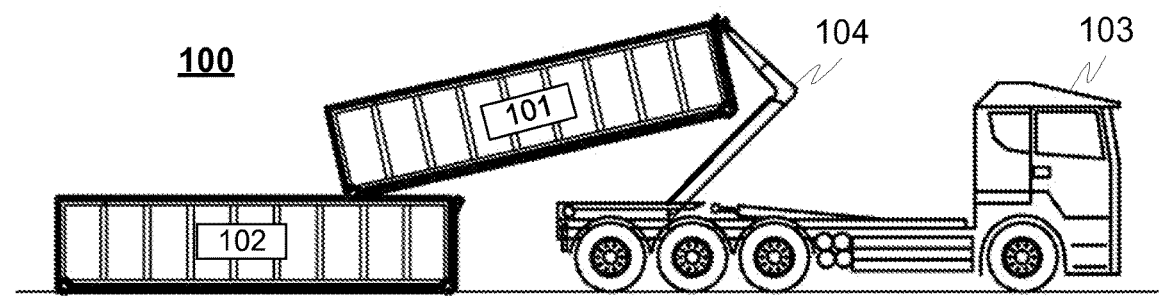
Figure 1D:
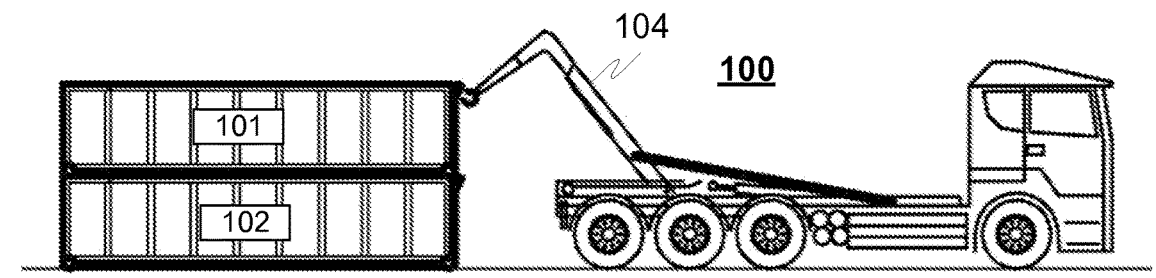

FIGS. 1A-1J illustrate a principle of an exemplary interchanging arrangement 100 and method for interchanging first 101 and second 102 load units carried by a vehicle 103 according to an advantageous embodiment of the invention, where in FIG. 1A the vehicle 103 is bringing the first load unit 101 to the site and taking the second load unit 102 away. In FIGS. 1B-1D a moving device 104 moves and unloads the first load unit 101 from the vehicle in a first direction 105, so backwards, and onto the top of the second load unit 102. The moving device 104 is as a traditional hook system, but may also be any other implementation, such as a chain, strap, belt or cable suitable for moving the load units.

Figure 1E:
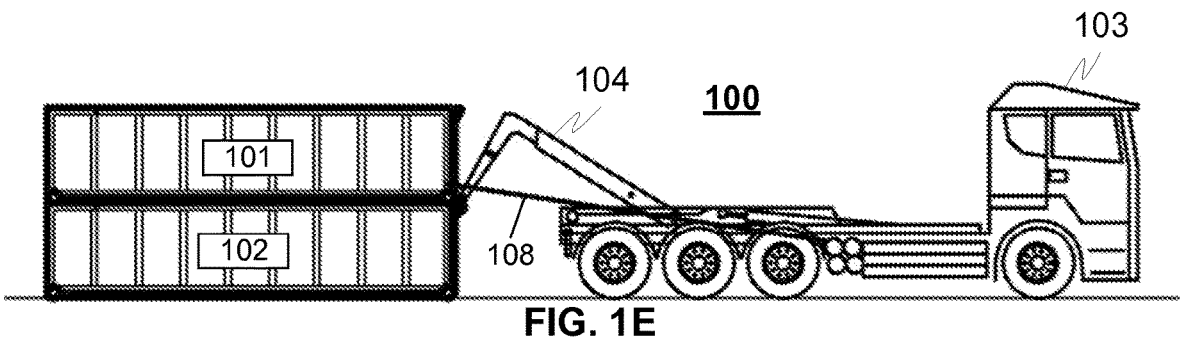
Figure 1F:
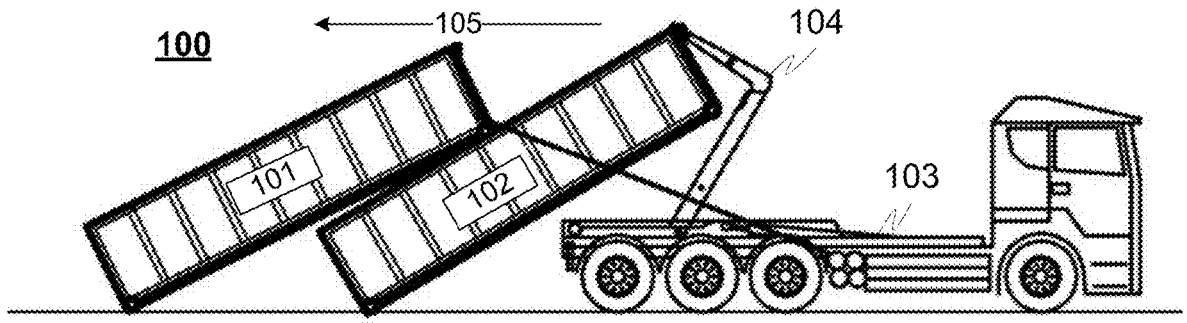

In FIG. 1E the moving device 104 releases the first load unit 101 and grip the second load unit 102 below the first load unit 101. Also a braking system 108 can be attached to the first end 101A of the first load unit when the second load unit 102 is gripped for loading. In FIG. 1F the moving device 104 moves and loads the second load unit 102 onto the vehicle so that the first load unit 101 slides on the top and along the second load unit 102 essentially in said first direction 105 in relation to the second load unit during loading the second load unit 102 onto the vehicle 103. The braking system 108 slows or controls the sliding speed of the first load unit 101 along and on the top of the second load unit 102. There is advantageously a sliding path 109 (illustrated in more details in FIG. 4) arranged into the top portion of the second load unit 102 along which the first load unit 101 is sliding.

Figure 1G:
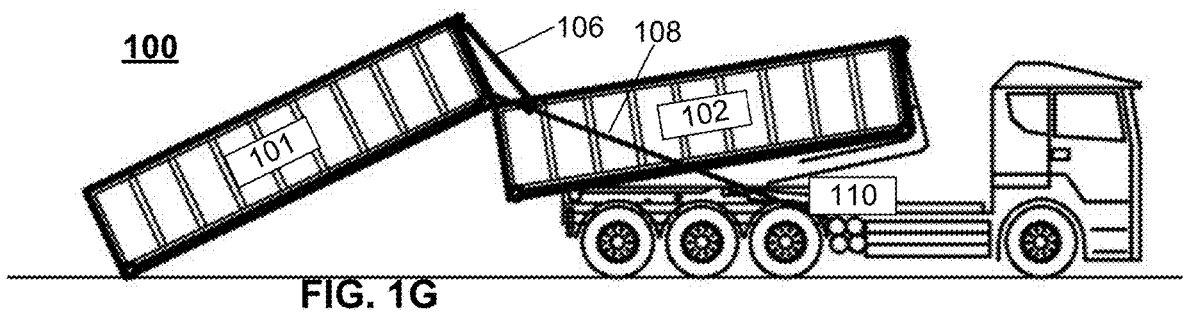

The first load unit 101 slides on the top (advantageously due to gravity, but also other mechanism can be implemented) and along the second load unit 102 advantageously until the first end 101A of the first load unit 101 meets and/or passes the second end 102B of the second load unit 102, as is the case in FIG. 1G (a portion of the landing device 106 is illustrated as at least partially opened in FIG. 1G but this is only for depicting the functional principle of the landing unit). When the first end 101A of the first load unit 101 meets and/or passes the second end 102B of the second load unit 102, a landing device 106 is advantageously activated between the first end 101A of the first load unit 101 and the second end 102B of the second load unit 102 (more details in FIGS. 6A-6C). As an example a first portion 106A (fixed portion) of the landing device 106 is fixed to the first end portion 101A of the first load unit, whereupon a second portion 106B (a free end portion) is configured to catch to the second end 102B of the second load unit 102.

Figure 1H:
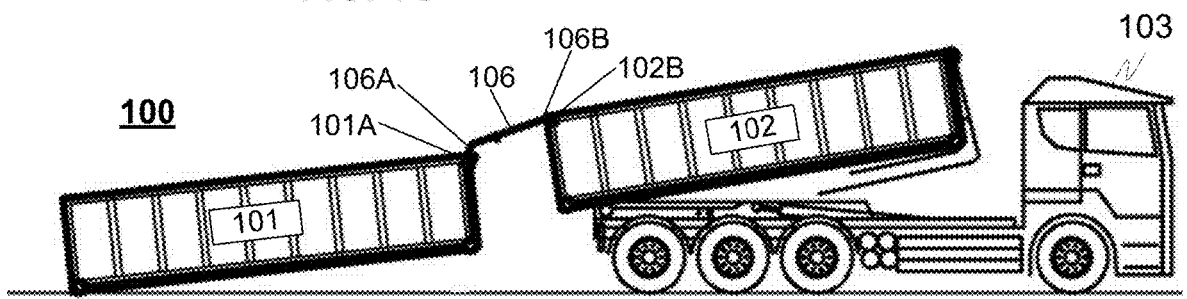
Figure 1I:
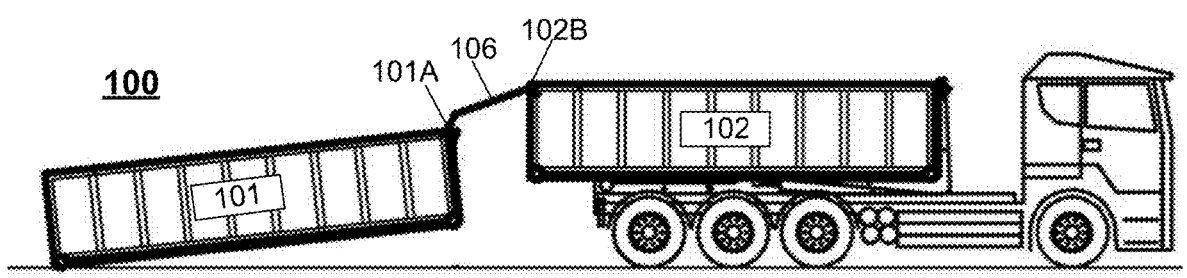
Figure 1J:
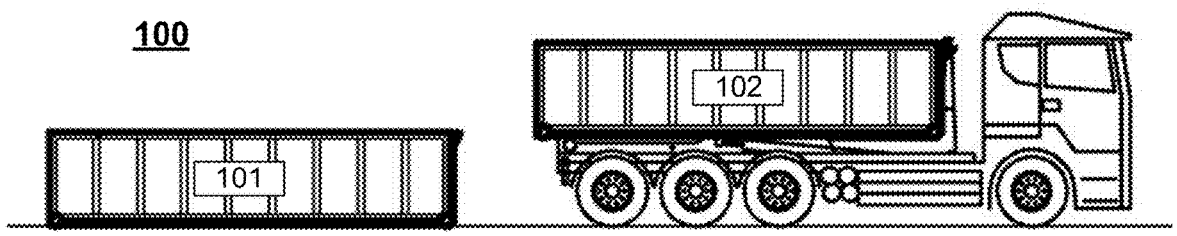

When the second load unit 102 is still moved towards and onto the vehicle (in the opposite direction of 105), the free end 106B of the landing device 106 is supported to the second end portion 102B of the second load unit 102, whereupon the landing device 106 is configured to move the first end 101A of the first load unit 101 into the lower level than the second end 102B of the second load unit 102, advantageously to the ground, as is illustrated in FIGS. 1H-1J.

It is to be noted that the braking system 108 can be used for controlling the sliding speed of the first load unit 101 when it slides on the top and along the second load unit 102 during the loading of the second load unit 102 onto the vehicle 103. The braking system 108 is released from the first unit 101 at the latest after the first end 101A of the first load unit 101 has met and passed the second end 102B of the second load unit 102. According to an example the first end 108A of the braking system 108 can be coupled to the second load unit 102 or to the vehicle 103 and the second end 108B of the braking system 108 to the first unit 101 and in particularly to the first end 101A of said first unit 101, as is illustrated in FIG. 2C.

Figure 2A:
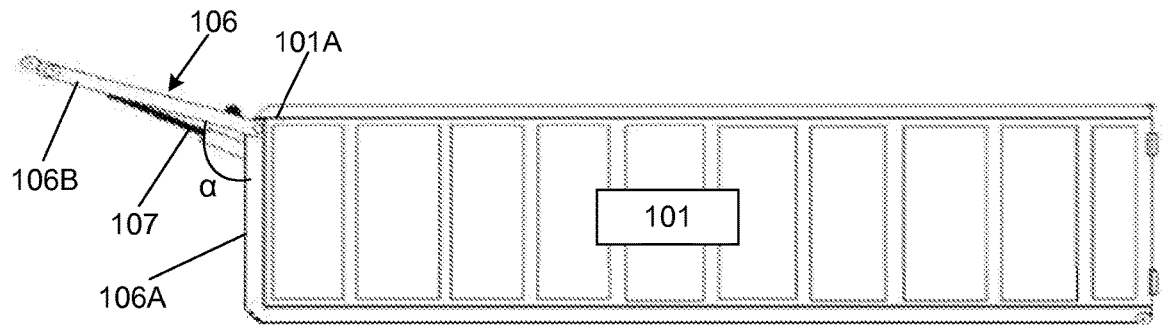
FIGS. 2A-2C illustrate exemplary interchanging arrangements according to an advantageous embodiment of the invention.
Figure 2B:
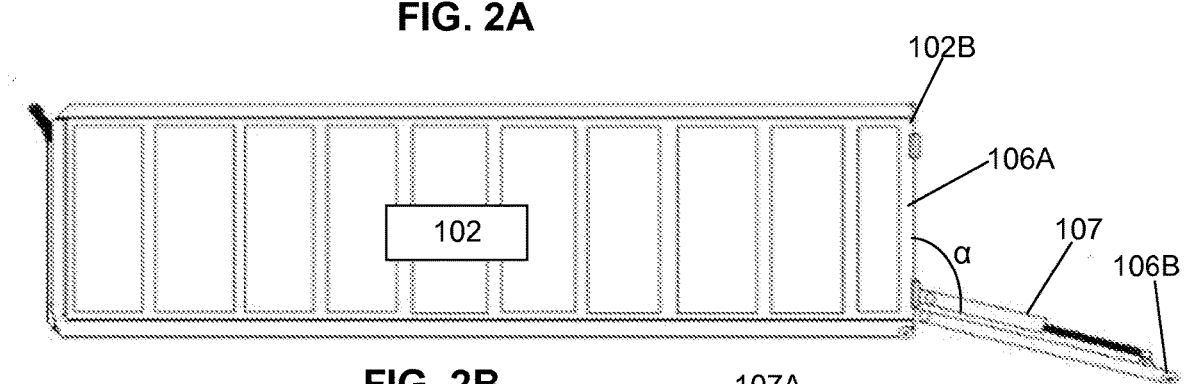
Figure 2C:
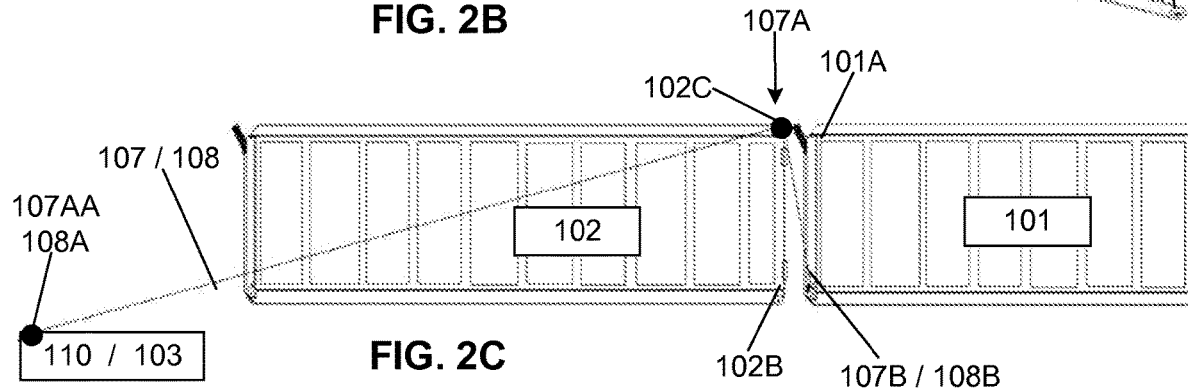

An exemplary braking system 108 illustrated in FIGS. 1G and 2C is implemented by a cable 108, the unwinding of which can be controlled by a controllable motor 110, such as by a hydraulic or electric motor, for example. However, it is to be noted that according to an exemplary embodiment and especially when the other end of the cable is fixed to the vehicle, there might be no need for controlling the length (unwinding or winding) the cable, but the cable may have a certain fixed length arranged so that when the load unit is unloaded e.g. by a traditional hook system 104, the trajectory of the first end 101A of the first load unit 101 is arranged to that the fixed length of the cable is enough. This can be applied also for landing or lowering process of the first end 101A of the first load unit 101 for example because the first end 101A does not essentially move in relation to the ground or vehicle in the direction 105 anymore when it is lowered.

The braking system 108 can also be implemented by other systems, such as a spring or a brake cylinder, such as a pneumatic or hydraulic cylinder, which is configured to control the sliding speed of the first load unit by the spring force or via force induced by the brake cylinder. In addition the braking system may also comprise a friction brake or other braking system suitable and known by the skilled person, such as an elongated arm, like a rod or bar.

Figure 3A:
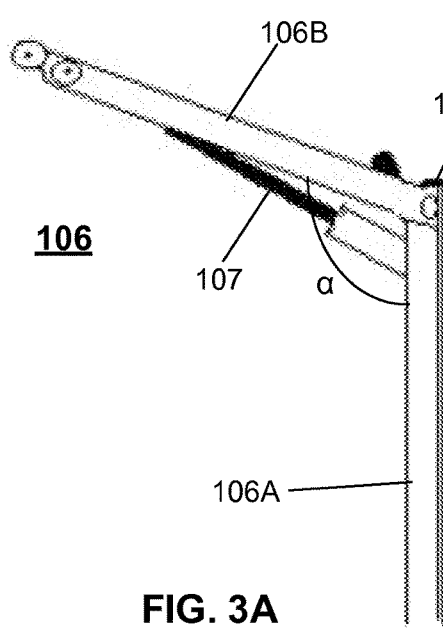
FIGS. 3A-3B illustrate exemplary landing devices according to an advantageous embodiment of the invention.
Figure 3B:
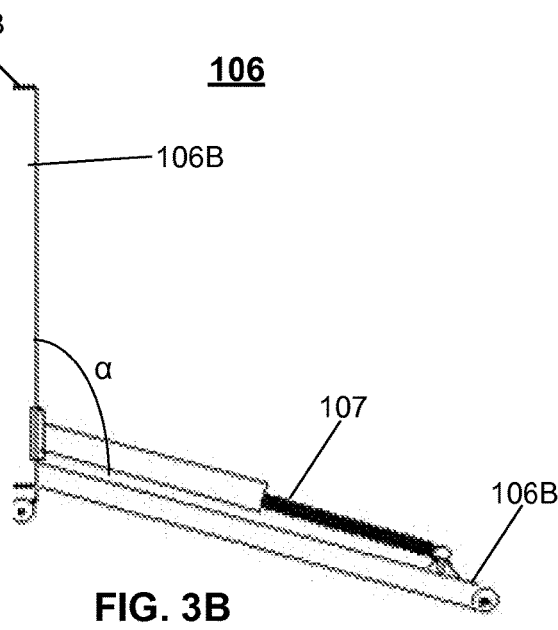

FIGS. 2A-2C and FIGS. 3A-3B illustrate exemplary interchanging arrangements 100 according to an advantageous embodiment of the invention, where in FIGS. 2A and 3A the landing device 106 is integrated to the first end 101A of the first load unit 101, and in FIGS. 2B and 3B the landing device 106 is integrated to the second end 102B of the second load unit 102.

In the example of FIGS. 2A and 3A (corresponding essentially the arrangement and method 100 illustrated in FIGS. 1A-1J) a first portion 106A of the landing device 106 is integrally fixed to the first end 101A of the first load unit 101, whereupon the second free portion 106B of the landing device 106 is configured to catch and to be supported to the second end 102B of the second load unit 102, when the first end 101A of the first load unit 101 is passed the second end 102B of the second load unit into the first direction 105, as is the case in FIGS. 1G-1H.

Alternatively, as can be seen in FIGS. 2B and 3B the first portion 106A of the landing device 106 can also be integrally fixed to the second end 102B of the second load unit 102, whereupon the second free portion 106B of the landing device is configured to catch and to be supported to the first end 101A of the first load unit 101, when the first end 101A of the first load unit 101 is passed the second end 102B of the second load unit into the first direction 105 (corresponding the situation illustrated in FIGS. 1G-1H).

The first and second portions 106A, 106B are coupled to each other in a rotating manner, such as hinged, so that an angle between the first and second portions 106A, 106B opens when the landing device 106 is activated and is moving or lowering the first end 101A of the first load unit 101 to the ground. The landing device 106 advantageously comprises a braking member 107 configured to apply force resisting the movement of the first and second portions 106A, 106B farther from each other or resisting the angle a between the first and second portions 106A, 106B to open and thereby enabling slow-motion lowering of the first end 101A of the first load unit 101.

FIG. 2C illustrates another example, where the landing device 106 with the braking member 107 is implemented by a cable, the unwinding and/or rewinding of which can be controlled. In the embodiment the first portion 107A of the cable is supported or coupled to the second end 102B of the second load unit 102 and the second portion 107B of the cable is supported or coupled to the first end 101A of the first load unit 101. According to an embodiment there is provided a support point 102C to the second end 102B for supporting the first portion 107A of the cable, advantageously to the upper portion of the second end of the second load unit. The unwinding and/or rewinding of the cable 107 can be controlled e.g. by a motor 110, to which the first end 107AA of the cable is coupled with. Also other mechanism can be used. By controlling the unwinding and/or rewinding of the cable 107 the mowing or lowering speed of the first end 101A of the first load unit can be managed and controlled.

According to an example the cable 107 (or the like) can be configured to function both as a braking system 108 for controlling the sliding speed of the first load unit 101 when it slides on the top and along the second load unit 102 during the loading of the second load unit 102 onto the vehicle, but also as the braking member 107 for slowing down the landing of the first end 101A of the first load unit 101 after the first end 101A of the first load unit 101 has met and passed the second end 102B of the second load unit 102. According to an advantageous embodiment the cable 107/108 (one and same cable for two different functions) can be first connected to the first end 101A of the first load unit 101 via the support point 102C, after which the cable 107/108 automatically functions as the braking member 107 after the first end 101A of the first load unit 101 has met and passed the second end 102B of the second load unit 102

FIGS. 3A and 3B still illustrate more detailed embodiment of the landing device 106 and the braking member 107. The braking member 107 can be implemented by or provided with e.g. a brake cylinder, such as a pneumatic or hydraulic cylinder or a spring or a mechanical construction, such as a friction brake. In addition also an electric or hydraulic motor can be used for braking of resisting the movement of the first end 101A of the first load unit 101 towards the ground. As an example a cable 107 can be attached to the first load unit 101 (as is illustrated in FIG. 2C) and in particularly to the first end 101A of the first load 101 unit so that it 101A/101 can be moved downwards in a controllable manner, such as unwinding the cable 107 by the motor 110 or the like. According to an embodiment the braking device is configured to be operated in a controllable manner.

According to an example the operation of the braking member 107 can be controlled, whereupon the moving or lowering speed of the first end 101A of the first load unit 101 can be controlled advantageously in a stepless way and so that the first end 101A of the first load unit 101 is lowered e.g. to the ground in a safe and controlled manner.

Figure 4A:
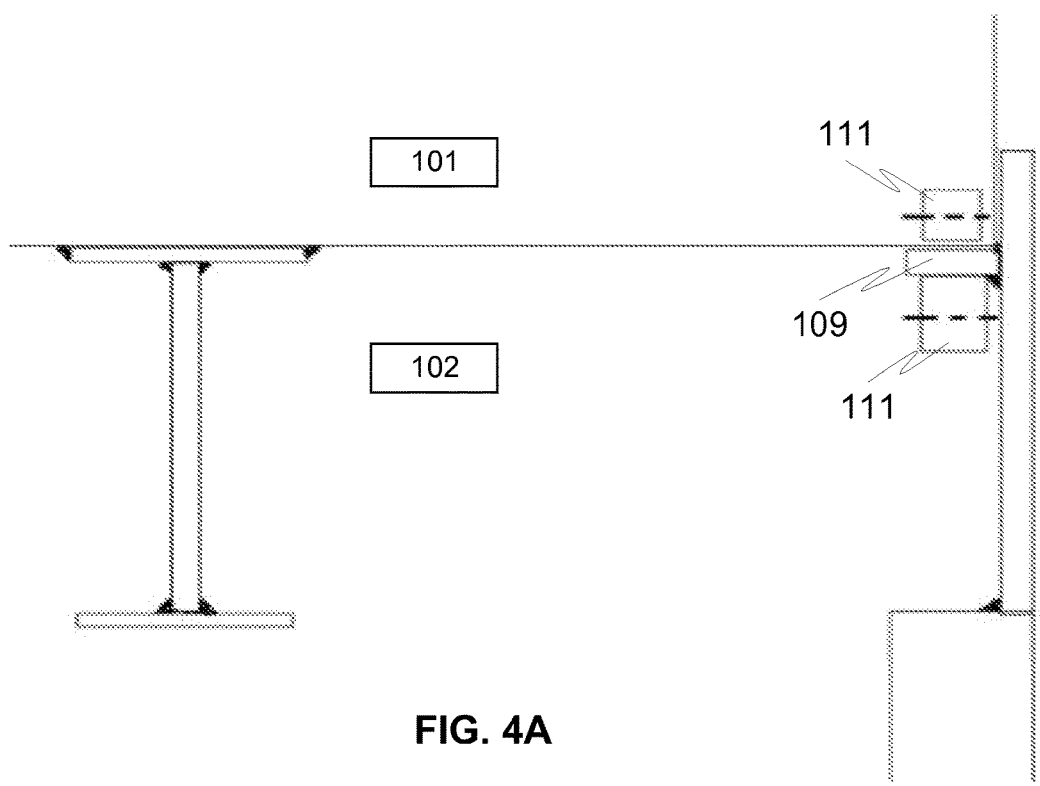
FIG. 4A illustrates a section view of an exemplary load unit with a sliding path according to an advantageous embodiment of the invention.

FIG. 4A illustrates a section view of an exemplary load unit 101, 102 with a sliding path 109 according to an advantageous embodiment of the invention, wherein the sliding path 109 is configured to receive and allow another load unit 101, 102 to slide along the sliding path 109 in the first direction 105 or in parallel to the longitudinal axis of the load unit and in relation to the lower load unit 101 during loading or unloading the load units 101, 102 onto or from the vehicle 103. The sliding path 109 comprises e.g. a rail or groove and it is advantageously arranged into the top portion of the load unit 101. Alternatively it can also be arranged to the bottom portion of the load unit 102.

The load unit 101 sliding along the sliding path 109 advantageously comprises a sliding member 111, such as a wheel or slide or ski or the like. It is to be noted the sliding member 111 is advantageously arranged to the landing device 106 as can be seen in more details in FIGS. 5A-5B and 6A-6C. In addition it is to be noted that the sliding member 111 may be arranged to the both sides of the sliding path 109, whereupon the sliding path 109 together the sliding member 111 will lock or secure the load unit 101 sliding along the sliding path 109 to the load unit 102 locating below the sliding load unit 101.

Figure 4B:
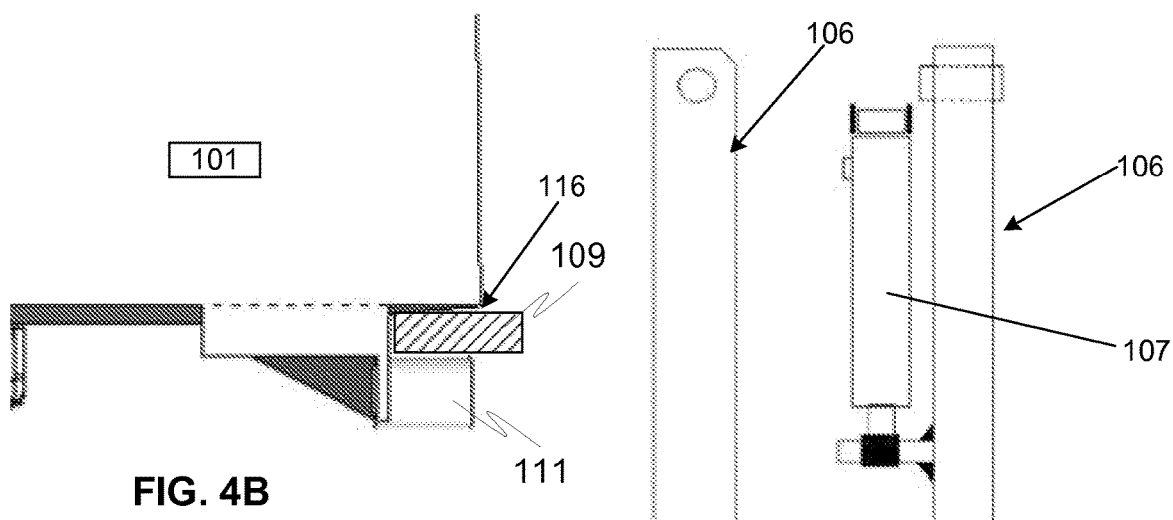
FIG. 4B illustrates another example of a sliding path with a sliding member according to an advantageous embodiment of the invention.

FIG. 4B illustrates another example of the sliding path 109, where the sliding path is implemented with a rail or bar 109. The first load unit 101 sliding along the sliding path 109 comprises a receiving structure 116 forming a groove or slot for receiving the sliding path 109 into the receiving structure 116. The receiving structure 116 can be formed e.g. by the base structure of the first load unit 101, for example a bottom portion of the first load unit 101 together with the sliding member 111 arranged to the structure of the first load unit.

Figures 5A, 5B:
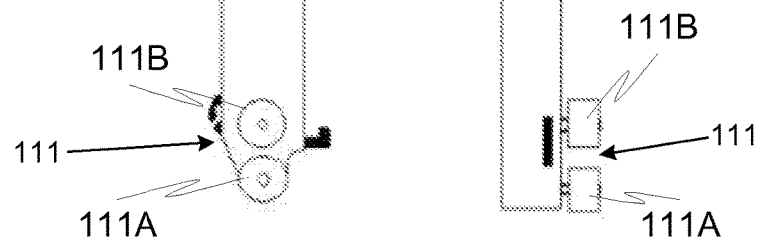
FIGS. 5A-5B illustrate an exemplary landing device with a braking member according to an advantageous embodiment of the invention.

FIGS. 5A-5B illustrate side and front views of an exemplary landing device 106 with a braking member 107 according to an advantageous embodiment of the invention, where the sliding member 111 can be clearly seen. The exemplary sliding member 111 comprises two wheels where the first wheel 111A is configured to be coupled below the sliding path 109 and the second wheel 111B is configured to be coupled above the sliding path 109.

Figure 6A:
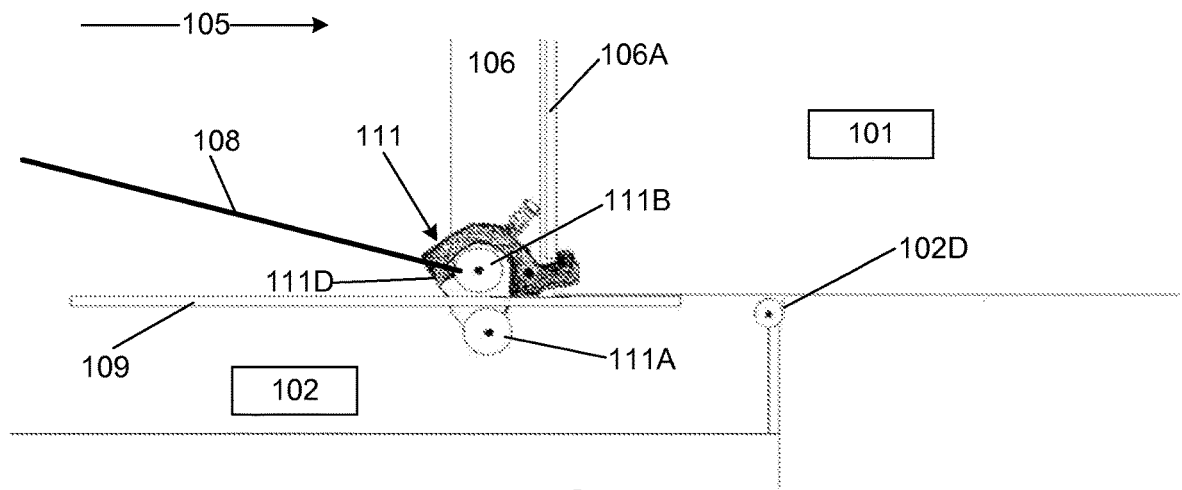
FIGS. 6A-6C illustrate a principle of a landing devices according to an advantageous embodiment of the invention.
Figure 6B:
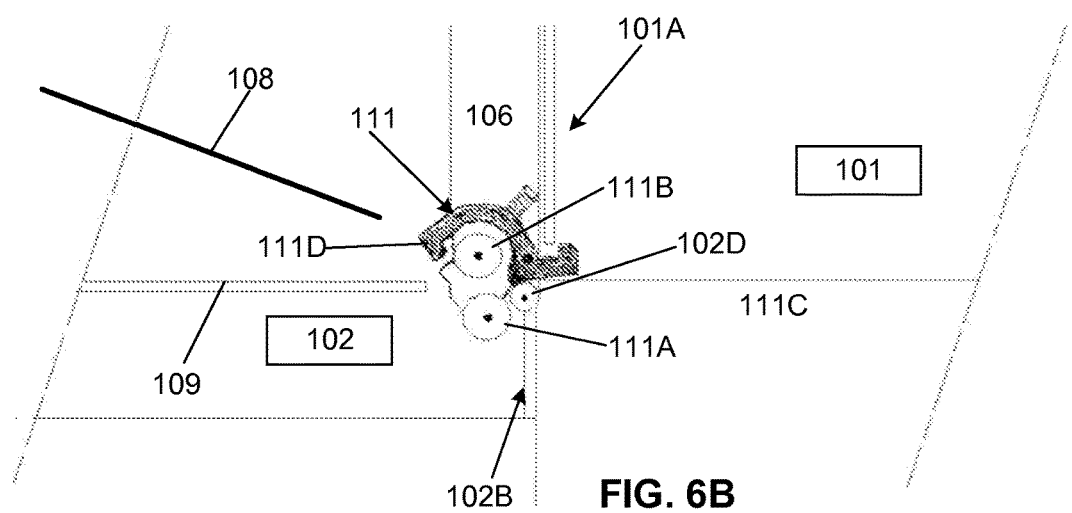
Figure 6C:
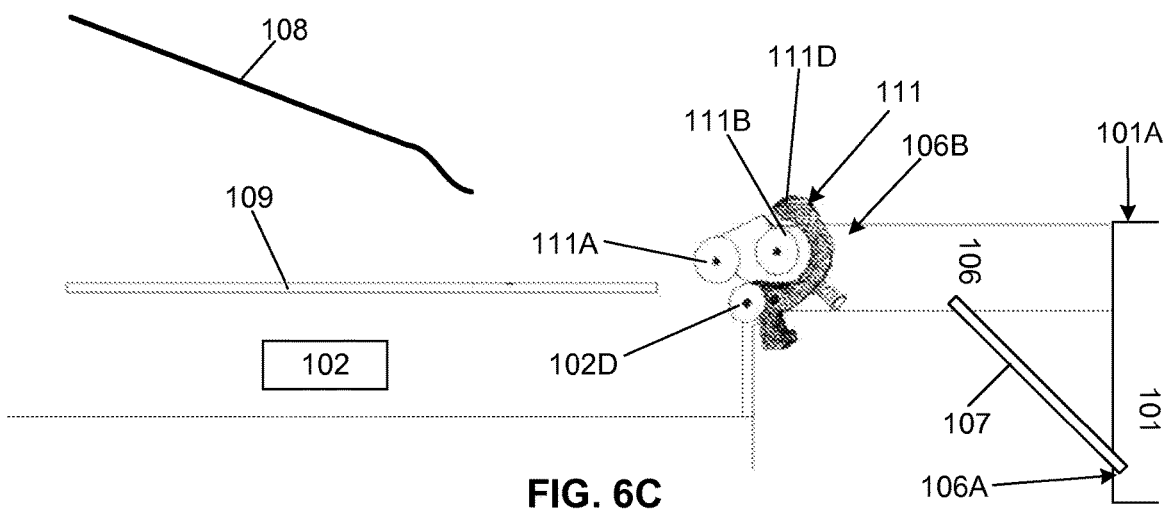

FIGS. 6A-6C illustrate a principle of a landing device 106 with a braking member 107 according to an advantageous embodiment of the invention. In FIGS. 6A-6C the first load unit 101 is sliding on the top of the second load unit 102 along the sliding path 109 in the direction 105. The braking system 108 is also used (optional) to resist the free sliding of the first load unit 101 as is disclosed elsewhere in this document. The second end 108B of the braking system 108 is coupled to the first unit 101 and the sliding speed of the first load unit along the sliding path 109 is controlled advantageously by a controlling device, such as a motor. In addition the controlling device can be implemented by other system known by the skilled person.

In the embodiment illustrated on FIGS. 6A-6C the first portion 106A of the landing device 106 is fixed to the first end portion 101A of the first load unit 101. When the first end 101A of the first load unit 101 or in more details the sliding member 111 has met and/or passed the second end 102B of the second load unit 102 or the supporting point 102D, the second portion 106B of the landing device 106 is configured to stop to the second end 102B of the second load unit 102 or the supporting point 102D and configured to be supported by the supporting point 102D and turn around the supporting point 102D so that the angle between the first and second portions 106A, 106B of the landing device 106 is opened. The opening is advantageously resisted by the braking member 107 between the first and second portions 106A, 106B.

When the first end 101A of the first load unit 101 has met the second end 102B of the second load unit 102, the sliding member 111 is configured to be turned around the supporting point 102D (to the clockwise in the FIGS. 6A-6C). At the same time coupling member 111D is configured to turn and release the braking system 108 (a cable in the embodiment in FIGS. 6A-6C), if used, from the sliding member 111 and thereby also from the first load unit 101.

Again, when the second load unit 102 is loaded onto the vehicle 103, the landing device 106 moves or lowers the first end 101A of the first load unit 101 to the ground or at least to the lower level than the second end 102B of the second load unit 102. When the opening angle between the first and second portions 106A, 106B of the landing device is increased enough or the second end 106B of the landing device or in practise the sliding member 111 has turned over a threshold angle around the supporting point 102D, the second end 106B will be released from the contact of the second end 102B or the supporting point 102D of the second load unit 102. Thus the landing device 106 is configured to be uncoupled after the first end 101A of the first load unit 101 is moved into the lower level than the second end 102B of the second load unit 102.

FIGS. 7A-7H illustrate examples of the sliding path structure 109 for guiding the load units 101, 102 according as well as a locking member to an advantageous embodiment of the invention. As can be seen in FIGS. 7A-H the second load unit 102 comprises the sliding path 109 and additionally the locking member 112 for stopping the sliding of the first load unit 101 (shown in particularly in FIGS. 7C-7G) when it slides on the sliding path 109.

The locking member 112 advantageously comprises a deflecting member 113, such as a wedge ramp 113, for deflecting the sliding member 111 of the first load unit 101 against a stopping member 114 (FIGS. 7C-7G), when the first load unit 101 slides on the sliding path 109. The first load unit 101 comprises advantageously the sliding member 111, as is described for example in connection with FIG. 4B. The sliding member 111 slides along the sliding path 109 until it is deflected by the deflecting member 113 so that the sliding member 111 meets the locking member 112 and thereby stops the sliding.

In more details the position of the locking member 112 can be adjusted in relation to the second load unit 102 advantageously in a direction 119 so that the deflecting member 113 will deflect the sliding member 111 when the center of gravity of the first load unit 101 is passed the second end portion 102B of the second load unit 102, whereupon the first end portion 101A and thus also the sliding member 111 is skipped upwards and against the stopping member 114. The locking member may comprise number of stopping members 114 both in the upper and lower portions of the sliding path 109.

The first load unit 101 can slide further in relation to the second load unit 102 in the direction 119 when the sliding member 111 is passed the stopping members 114 e.g. by moving the first end 101A and thus also the sliding member 111 as is described elsewhere in this document and in particularly in FIGS. 7C-7G.

The stopping member 112 may comprise also a shock absorption mechanism 118 for absorbing kinetic energy of the first load unit 101 when stopping the movement of said first load unit.

Figure 7A:
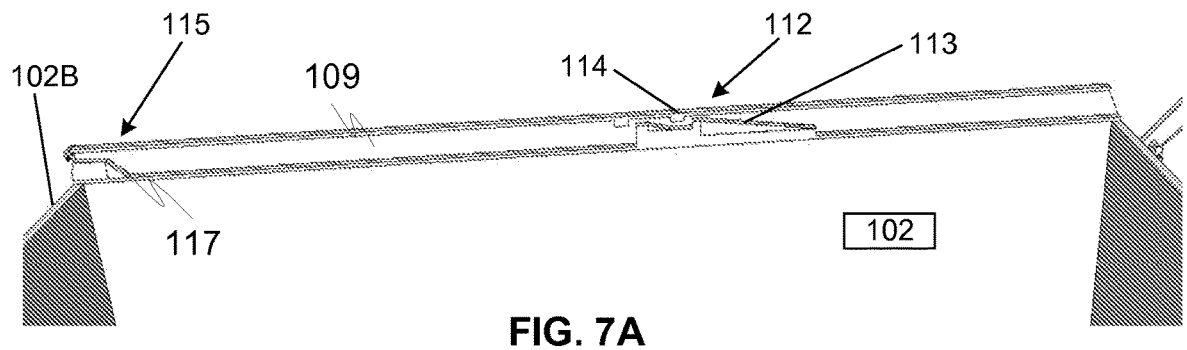
FIGS. 7A-7H illustrate examples of the sliding path structure for guiding the load units according to an advantageous embodiment of the invention.
Figure 7B:
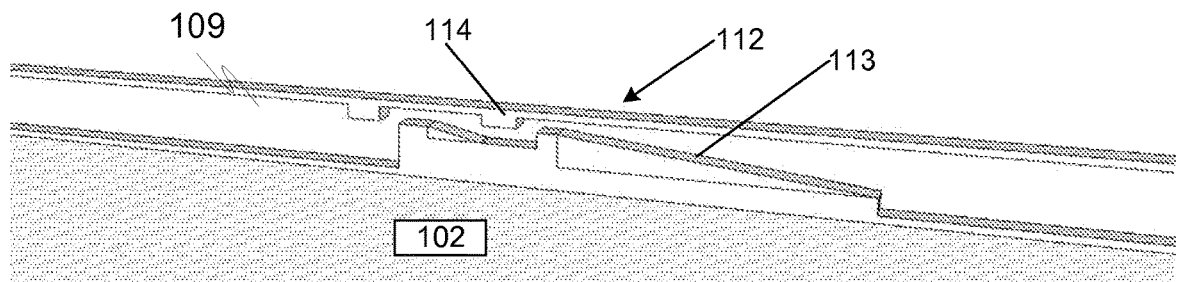
Figure 7C:
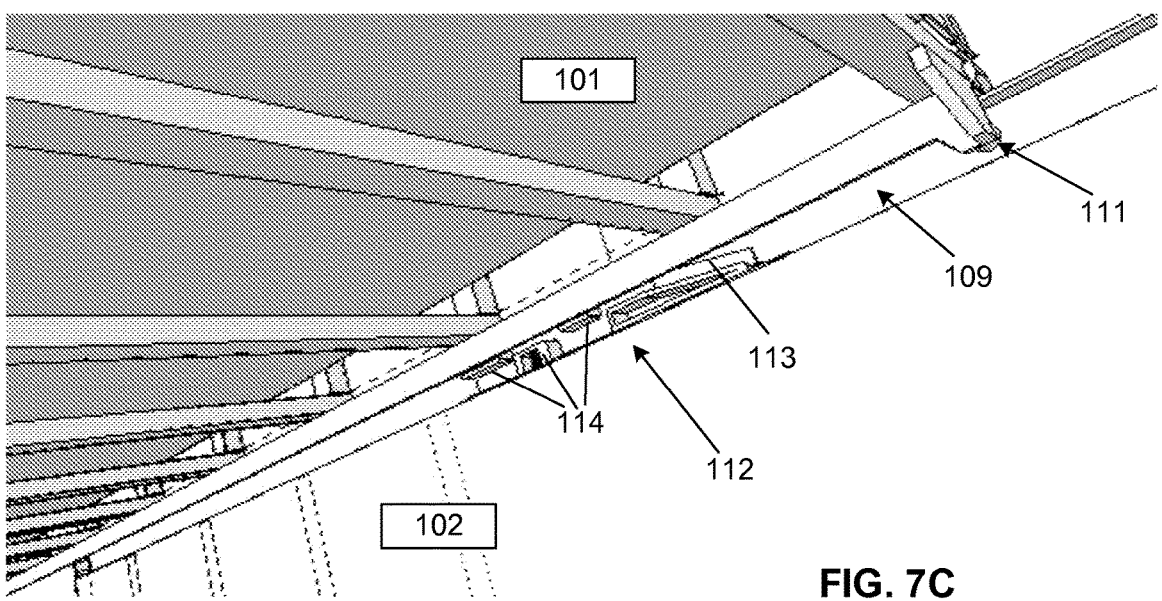
Figure 7D:
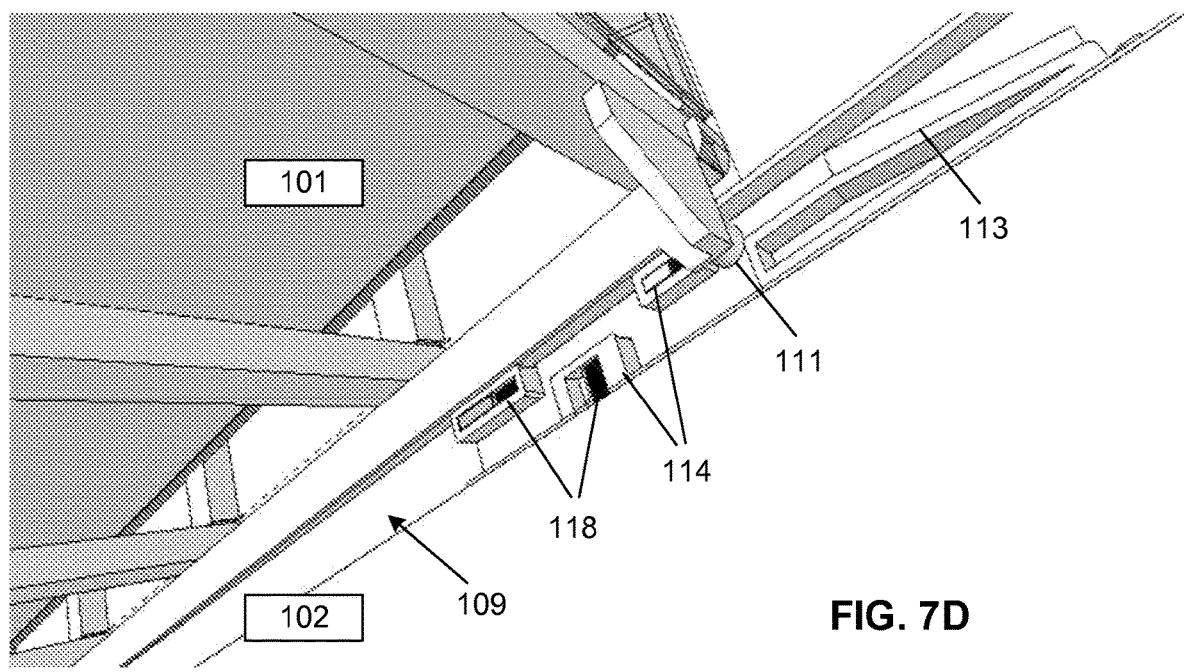
Figure 7E:
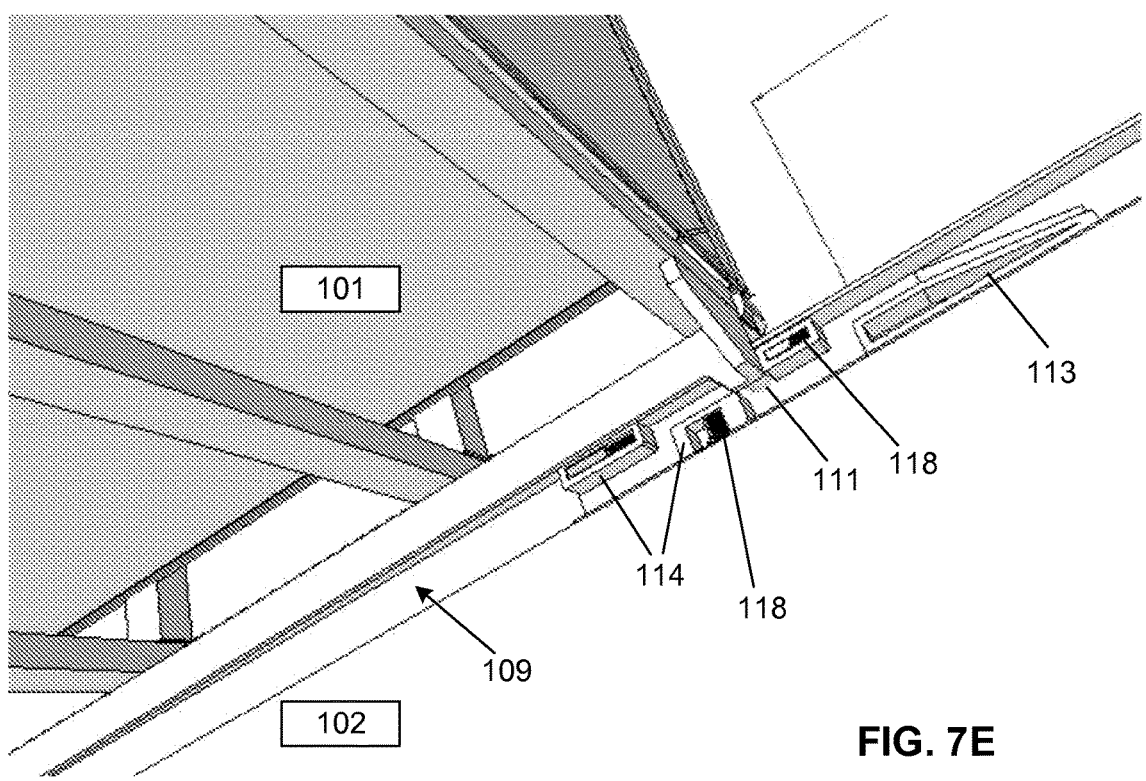
Figure 7F:
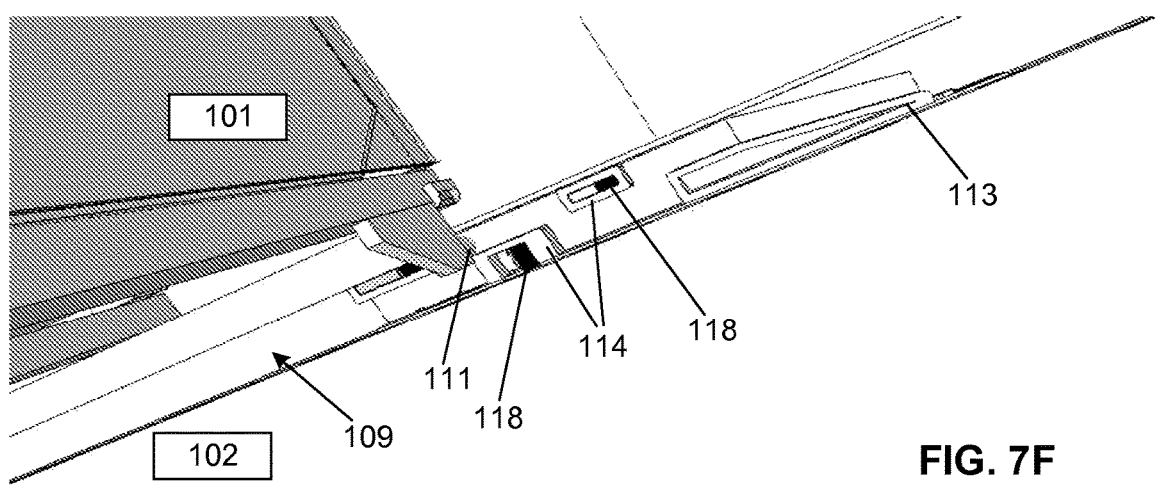
Figure 7G:
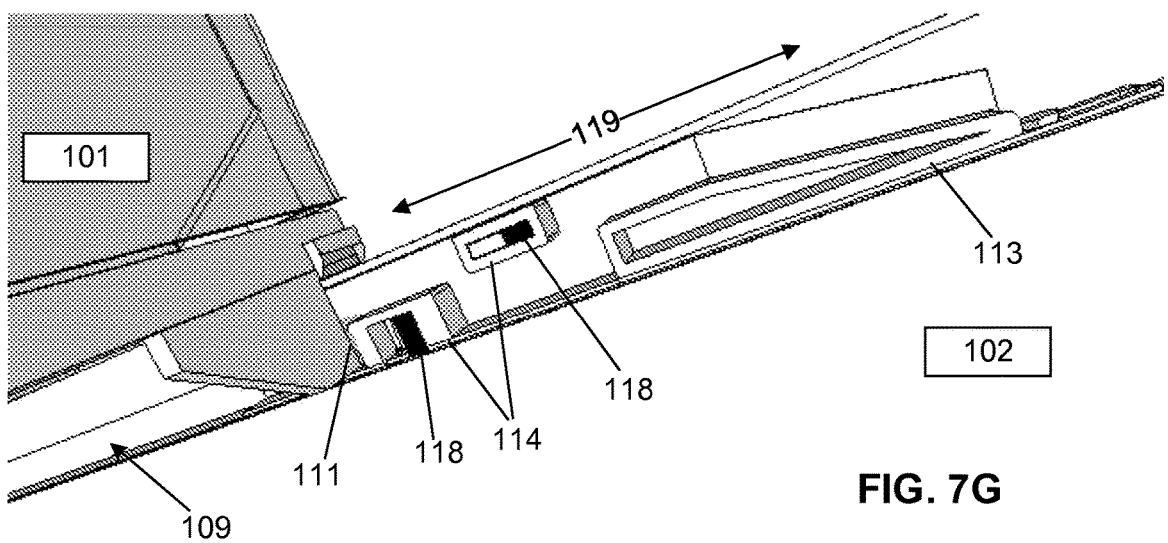
Figure 7H:
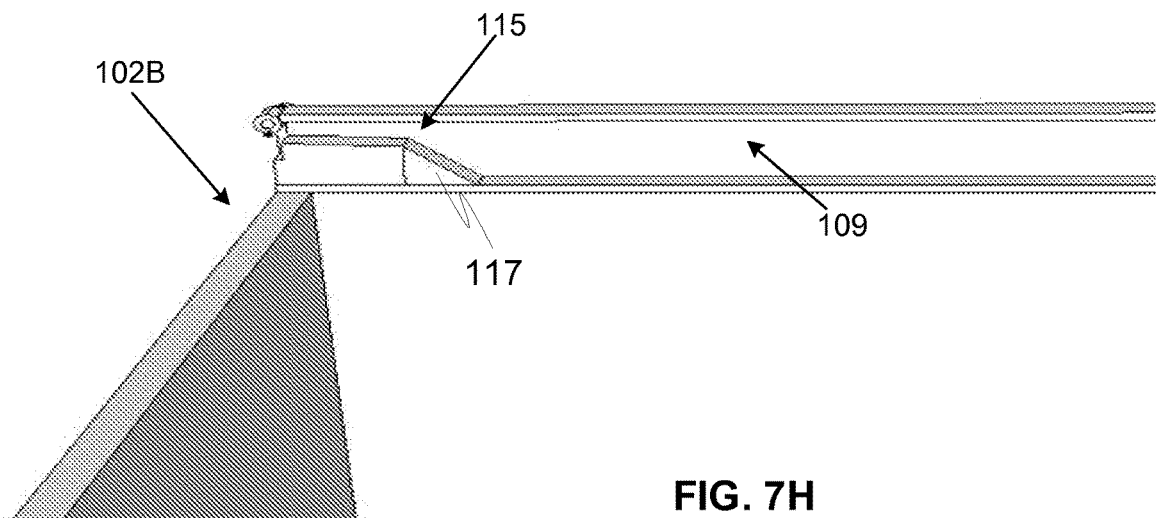

In addition the second load unit 102 may comprise an introduction member 115 at an end portion of the second end 102B of the second load unit 102, as is described in FIG. 7H. The introduction member 115 introduces the first end 101A of the first load unit 101 to the landing device 106. For this the introduction member 115 comprise e.g. a deflection member 117, which will deflect the first end 101A of the first load unit 101 or the sliding member 111 of the first load unit 101 so that it better meets the landing device 106.

Figure 8A:
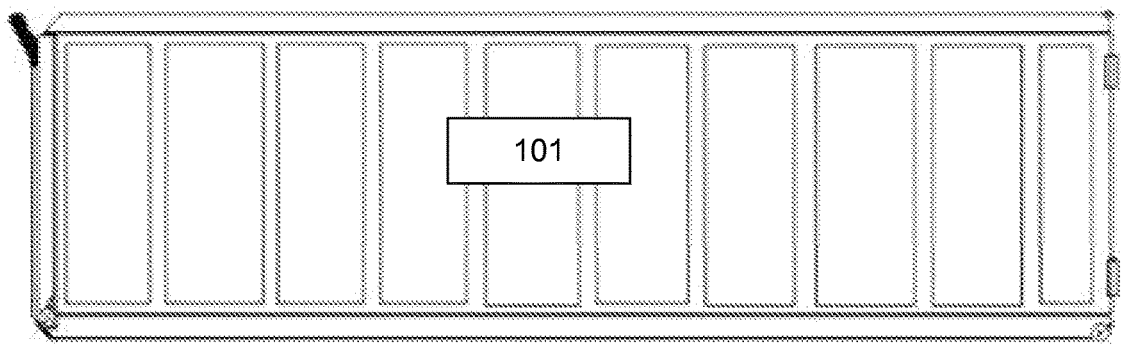
FIGS. 8A-8C illustrate examples of the load units according to an advantageous embodiment of the invention.
Figure 8B:
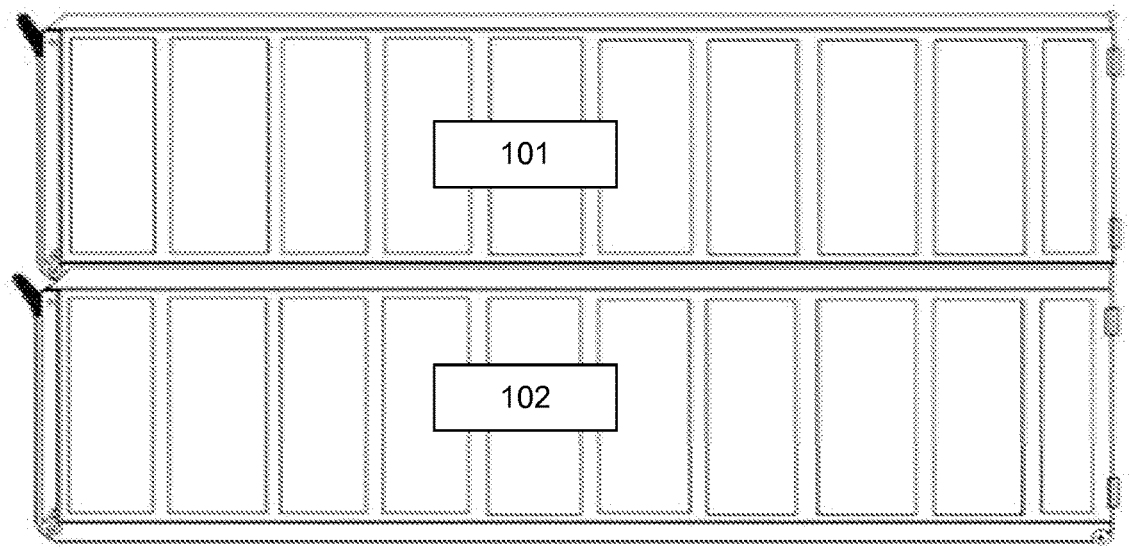
Figure 8C:
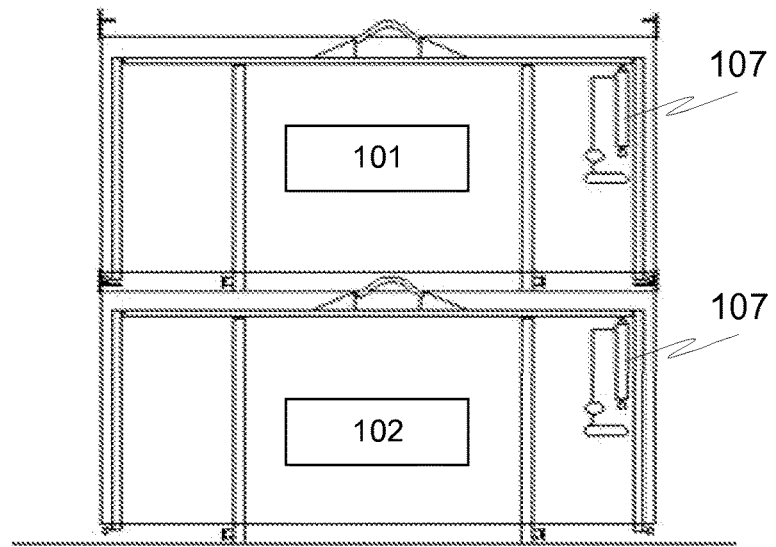

FIGS. 8A-8C illustrate examples of the load units 101, 102 according to an advantageous embodiment of the invention, where in FIG. 8A a side view of one load unit 101 is illustrated. In FIG. 8B the first load unit 101 is stacked or loaded on the top of the second load unit 102, advantageously via the sliding path 109. FIG. 8C illustrates a front view of the stacked load units 101, 102, where the braking member 107 of the landing device is also shown.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims. For example a cable is demonstrated as an example of the braking member 107 and system 108, but also other types of suitable devices can be used, such as belt, strap or chain, for example.

In addition, even if only two load units are demonstrated in Figures, they are only examples and also more than two load units can be loaded on top of each other and carried. Moreover it is to be noted that even if the load units depicted in Figures have the side wall and/or end walls, the side and/or end walls are however not essential, but e.g. the load unit can be implemented also as a platform with just ends (101A, 101B, 102A, 102B) and without actual walls.

The features recited in dependent claims are mutually freely combinable unless otherwise explicitly stated.

The invention claimed is:

1. An arrangement for loading and unloading first and second load units carried by a vehicle, both of said load units having first and second ends,
   wherein the arrangement comprises:
   a hook system, chain, strap, belt or cable for moving and loading the second load unit onto the vehicle and causing the first load unit to slide above the second load unit in a first direction,
   a landing device arranged between the first end of the first load unit and the second end of the second load unit so that a first portion of said landing device is supported by the first end of the first load unit and a second portion of said landing device is supported by the second end of the second load unit,
   wherein
   said landing device is configured to move said first end of said first load unit into a lower level than the second end of the second load unit after said first end of the first load unit is moved in the first direction so that it passes said second end of the second load unit in said first direction and thereby unload the first load unit.

2. The arrangement of claim 1, wherein said arrangement comprises a braking member configured to slow down the moving of said first end of said first load unit.

3. The arrangement of claim 2, wherein said braking member is arranged between said first and second portions of said landing device, said braking member configured to brake movement of said first and second portions of said landing device farther from each other.

4. The arrangement of claim 3, wherein said braking member has first and second ends and comprises a spring or a brake cylinder or a cable the unwinding of which is controlled, the first end of said braking member being coupled with the first portion of said landing device and the second end of said braking member being coupled with the second portion of said landing device, or wherein the braking member comprises a friction brake.

5. The arrangement of claim 3, wherein the first portion of the landing device is fixed:
   to the first end of the first load unit, whereupon the second portion of the landing device is configured to be coupled to the second end of the second load unit after said first end of the first load unit is moved in the first direction so that it passes said second end of the second load unit in said first direction, or
   to the second end of the second load unit, whereupon the second portion of the landing device is configured to be coupled to the first end of the first load unit after said first end of the first load unit is moved in the first direction so that it passes said second end of the second load unit in said first direction.

6. The arrangement of claim 2, wherein said braking member comprises a cable with first and second portions, where the first portion of said cable is supported by or coupled to the second end of the second load unit and the second portion of said cable is supported by or coupled to the first end of the first load unit.

7. The arrangement of claim 6, wherein the braking member comprises a controllable motor, which is configured to control unwinding of the cable and thereby slow down the moving of said first end of said first load unit after said first end of the first load unit is moved in the first direction so that it passes said second end of the second load unit in said first direction.

8. The arrangement of claim 6, wherein said cable is configured to function as a braking system for controlling sliding speed of the first load unit when it slides on above and along the second load unit in the first direction during the loading of said second load unit onto the vehicle, and after said first end of the first load unit is moved in the first direction so that it passes said second end of the second load unit in said first direction, wherein said cable is in addition configured to function as said braking member for slowing down the moving of said first end of said first load unit.

9. The arrangement of claim 1, wherein said landing device is configured to be removed from the first end of the first load unit and the second end of the second load unit after said first end of said first load unit is moved into the lower level.

10. The arrangement of claim 1, wherein the arrangement comprises a braking system having first and second ends, said braking system being configured to control a sliding speed of the first load unit when it slides above and along the second load unit during the loading of said second load unit onto the vehicle.

11. The arrangement of claim 10, wherein the first end of the braking system is coupled to the second load unit or to the vehicle and the second end of the braking system is coupled to the first load unit.

12. The arrangement of claim 10, wherein the braking system comprises a spring or a brake cylinder configured to control the sliding speed by a spring force or via force induced by the brake cylinder.

13. The arrangement of claim 10, wherein the braking system comprises a cable with a fixed length, or a cable the unwinding of which is controlled by a controllable motor, or wherein the braking system comprises a friction brake, or wherein the braking system is an elongated arm, a rod or a bar.

14. The arrangement of claim 10, wherein the landing device is configured to release the braking system from the first load unit after said first end of the first load unit is moved in the first direction so that it passes said second end of the second load unit in said first direction.

15. The arrangement of claim 1, wherein the second load unit comprises a sliding path to receive and allow the first load unit to slide along said sliding path during loading the second load unit onto the vehicle.

16. The arrangement of claim 15, wherein the second load unit comprises the sliding path and a locking member arranged in connection with the sliding path, and the first load unit comprises a sliding member configured to slide along said sliding path, wherein said locking member is configured to stop the sliding of the first load unit via an interaction with said sliding member of the first load unit, when it slides on the sliding path.

17. The arrangement of claim 16, wherein the locking member comprises a wedge ramp for deflecting the sliding member of the first load unit against a stopping member when the first load unit slides on the sliding path.

18. The arrangement of claim 16, wherein the stopping member comprises a shock absorber for absorbing kinetic energy of the first load unit when stopping the movement of said first load unit.

19. The arrangement of claim 1, wherein the second load unit comprises a ramp at an end portion of the second end of the second load unit, where said ramp is configured to introduce the first end of said first load unit to the landing device after said first end of the first load unit is moved in the first direction so that it passes said second end of the second load unit in said first direction and thereby allowing the moving of said first end of said first load unit into the lower level.

20. The arrangement of claim 1, wherein the hook system, chain, strap, belt or cable is arranged for:

moving and unloading the first load unit from the vehicle in said first direction and onto a top of the second load unit, releasing the first load unit, gripping the second load unit below the first load unit and moving and loading said second load unit onto the vehicle so that said first load unit is still on the top of the second load unit at the beginning of the moving of the second load unit and so that said first load unit slides on the top and along the second load unit in said first direction during loading said second load unit onto the vehicle until the first end of the first load unit meets the second end of the second load unit.

21. A vehicle comprising an arrangement for loading and unloading first and second load units carried by the vehicle, both of said load units having first and second ends, wherein said arrangement comprises:

a hook system, chain, strap, belt or cable for moving and loading the second load unit onto the vehicle and causing the first load unit to slide above the second load unit in a first direction, a landing device arranged between the first end of the first load unit and the second end of the second load unit so that a first portion of said landing device is supported by the first end of the first load unit and a second portion of said landing device is supported by the second end of the second load unit, wherein said landing device is configured to move said first end of said first load unit into a lower level than the second end of the second load unit after said first end of the first load unit is moved in the first direction so that it passes said second end of the second load unit in said first direction and thereby unload the first load unit.

\* \* \* \* \*